(No Model.)

C. PERRIN.
HARROW.

No. 502,692.                    Patented Aug. 1, 1893.

Witnesses:
Edwin L. Bradford
R. W. Bishop

Charles Perrin
  Inventor:

By Alexander & Davis
        Attorneys

UNITED STATES PATENT OFFICE.

CHARLES PERRIN, OF DAYTON, OHIO, ASSIGNOR, BY DIRECT AND MESNE ASSIGNMENTS, TO CHARLES LA DOW, OF ALBANY, NEW YORK.

HARROW.

SPECIFICATION forming part of Letters Patent No. 502,692, dated August 1, 1893.

Application filed March 16, 1891. Serial No. 385,181. (No model.)

*To all whom it may concern:*

Be it known that I, CHARLES PERRIN, a citizen of the United States, residing at Dayton, in the county of Montgomery and State of Ohio, have invented certain new and useful Improvements in Harrows, of which the following is a specification, reference being had therein to the accompanying drawings.

Figure 1:
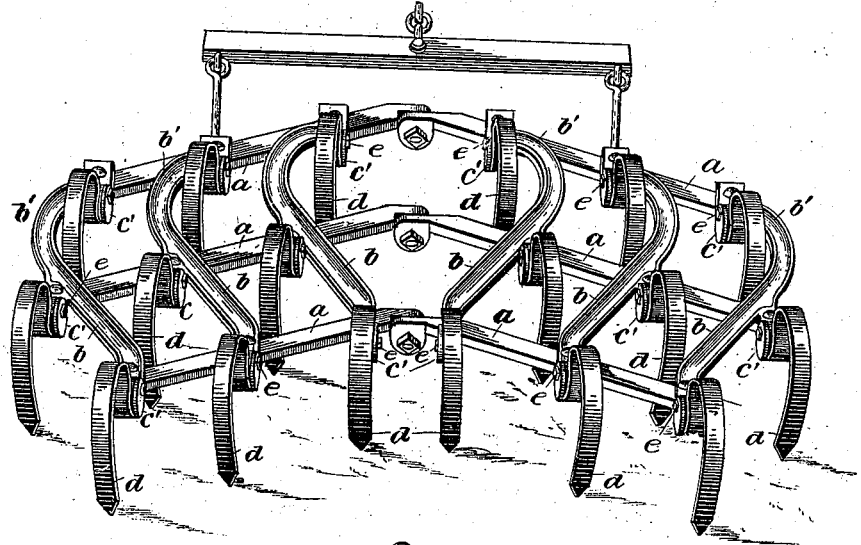
Figure 2:
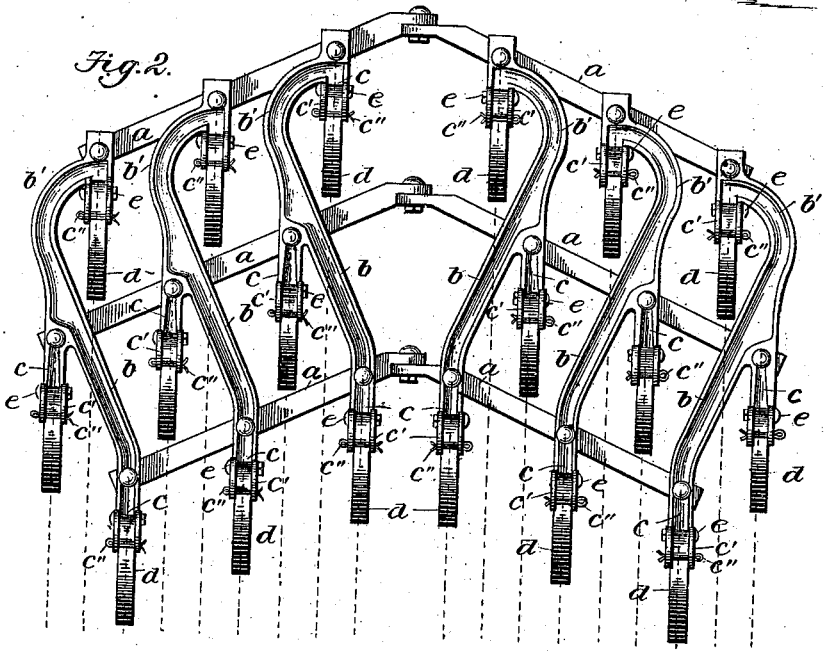

Figure 1 represents a perspective view, of my improved harrow looking at it from the rear; Fig. 2 a plan view thereof; and Fig. 3 a detail, sectional view showing the construction of the tooth and its holding device more clearly.

This invention has particular relation to that class of harrows constructed of two hinged or pivotally connected sections adapted to be folded up for transportation, each section being constructed of oblique metal cross-bars secured rigidly together at their points of intersection with each other and carrying the spring harrow-teeth, as will be more fully hereinafter described.

The object and nature of the present improvement will be fully understood and appreciated from the following specification when taken in connection with the annexed drawings.

Referring to the drawings by letters, $a$ designates the oblique draft-bars pivoted together at their inner ends so as to enable the two sections to accommodate themselves to the undulations of the soil and also to enable them to be folded over upon each other for transportation. The oblique parallel tooth-carrying bars $b$ are bolted to the draft-bars at the intersection with the same, either on top of the draft-bars as shown, or underneath the same, as may be desired. These tooth-bars are arranged obliquely to the line of draft, the bars of one section of the harrow diverging from those of the other section and they are each, near their forward ends, to the rear of their point of connection to the front draft bars, turned inwardly toward the central line of draft, and thence rearwardly therefrom parallel with the line of draft, forming a front bow portion with two side limbs extending rearwardly from said front and integral therewith. Three tooth-holders are preferably formed on each bar, the forward one of each bar being arranged at the crook $b'$ of the curved front. The crooks or bends in the forward ends of the bars permit the forward tooth-holders to be brought around or placed so that they will alternate with the rear holders on their respective bars, whereby when the harrow is in operation no two teeth will work in line with each other but will work on lines equal distances apart, thus getting the full benefit from each tooth and thoroughly and effectually pulverizing the soil. A flange or rib is affixed to each bar, which strengthens its curves, and also affords elevated bearings for the teeth.

Figure 3:
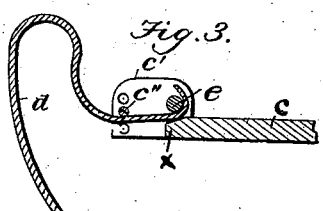

Upon the rear end of each of the tooth-holders is formed or secured a pair of rearwardly projecting vertical brackets or plates $c'$ which are separated sufficiently to receive the upper forward ends of the spring teeth $d$. The forward end of each of the teeth has formed upon it a hook which engages with a horizontal bolt, bar or cross piece upon which a tooth is mounted and which is passed horizontally through each pair of brackets near their forward ends, the ends of the bars extending in between the brackets to form stops or abutments for the forward ends of the teeth and prevent their displacement, either while in operation or when folded for transportation, as shown in Fig. 3. From its forward end the tooth extends rearwardly and then curves upwardly where it is again bent over rearwardly into an approximate semi-circle and then curved downwardly and slightly forwardly a suitable distance, its end being brought to a point as usual. The rear ends of the plates or brackets $c'$ have each a vertical series of holes, the holes in one bracket registering with those in the other bracket, thus enabling the tooth to be raised and lowered by means of a removable horizontal split pin $c''$ passed through the registering holes above the tooth. The brackets serve to brace and prevent undue movement of the rods and teeth, without, at the same time, impairing their rocking adjustability. It will also be observed that with this manner of attaching the teeth to their holder all danger of the teeth becoming displaced is avoided inasmuch as the ends of the teeth clasp their rods and form positive locks for the same, serving to prevent their displacement no matter what position the teeth may be in. The strain of the teeth is communicated thereby to the rods about the axes of which they may be adjusted.

While the foregoing details of construction constitute preferred devices for carrying out the principles of my invention and involve construction which I regard the best for the purpose, it will be apparent to those skilled in the art that various modifications and changes may be made without departing from my invention, hence for the broader purpose of my invention I do not confine myself in this respect. It will also be observed that the angle beam may be very light and stiff and that the angle portions or flanges thereof serve to raise the attached ends of the teeth at a distance above the ground, and that the teeth may rock on the axis of their rods without change of position relatively thereto, so that the teeth are always alike vibratory when set at any pitch, because the distance between their points and fastened portions is not varied by any adjustment.

Having thus fully described my invention, what I claim as new, and desire to secure by Letters Patent, is—

1. In a harrow, the combination of curved teeth, and an angle iron frame beam having a curved, bowed or pointed front portion connected integrally with rearwardly extending arms or tooth-carrying portions, the flanges of the beam serving to strengthen the curved, bowed or pointed portion thereof and to hold the shanks of the teeth in an elevated position above the ground.

2. A harrow having a frame bar provided with a flange and brackets rising above the flange, in combination with cross pieces or rods supported in the brackets and teeth having their ends bent around said cross pieces and secured thereto in such manner that the strain of the teeth is communicated directly to the cross pieces.

3. In a float harrow, an angle iron beam in combination with teeth hinged directly to the upwardly projecting flanges of the beam, or to brackets rigidly fixed thereto, whereby the teeth may be rocked on an elevated center of motion supported by a rigid portion of the frame.

4. A harrow frame structure composed of a longitudinal metal beam formed integrally with a vertical rib or flange, in combination with a transverse rod supported by two ribs or flanges, in combination with a tooth mounted on the rod and secured thereto in such manner that the strain of the tooth is communicated directly to the rod.

5. In a harrow, the combination of a pair of sections hinged together at their adjacent edges, so as to be capable of folding over upon each other, a series of diverging bars $b$ on each of said sections, each of said bars being provided with a series of integral rearwardly extending arms $c$, these arms having formed on their rear ends pairs of integral clamping plates $c'$, and spring-teeth adjustably secured between the said clamping-plates, substantially as described.

6. The combination in a harrow of the two sections hinged together, each section being constructed of draft-bars and oblique intersecting tooth carrying bars bolted thereto, the tooth carrying bars of one section diverging from those of the other section and being turned or bent inwardly near their forward ends, tooth holding arms carried by these latter bars and extending rearwardly therefrom the tooth holders of the front row alternating with the holders in the rear, and teeth carried by the said tooth holding arms, substantially as described.

7. The combination with an arm provided with a pair of plates and a horizontal bolt connecting these plates, of a spring harrow-tooth having formed on its forward end a hook engaging under the said bolt the tooth being extended rearwardly from the said bolt, and from thence bent rearwardly, the end of the said arm extending in under the said hook, as at X, and means carried by the rear ends of the wings for adjusting and holding the tooth in its adjusted position, substantially as described.

8. The combination of channel-iron frame-bars provided with vertical flanges and spring harrow teeth having their shanks secured longitudinally directly between said flanges, substantially as described.

In testimony whereof I affix my signature in presence of two witnesses.

CHARLES PERRIN.

Witnesses:
 HORACE M. FRANK,
 JOHN L. H. FRANK.